Aug. 20, 1935. H. BECK 2,012,180

METHOD OF PRODUCING SEEDLINGS AND GERMINATED SEEDS WITHOUT EARTH

Filed May 10, 1934

Inventor:
Hermann Beck

Patented Aug. 20, 1935

2,012,180

UNITED STATES PATENT OFFICE 2,012,180

METHOD FOR PRODUCING SEEDLINGS AND GERMINATED SEEDS WITHOUT EARTH

Hermann Beck, Berlin-Zehlendorf, Germany

Application May 10, 1934, Serial No. 724,962
In Germany May 6, 1933

3 Claims. (Cl. 47—14)

This invention relates to a method for producing seedlings and germinated seed without the air of earth, for use as nutriment or fodder.

When employing seedlings as nutriment or fodder, it is especially important that they are much better digested and utilized to a much higher extent for building up the organism than is the case with grains, because the nutritive substances in the plants produced by germination or in the germinated seeds are much better disintegrated than in the ungerminated seeds. Experience has shown that grain fodder is digested by animals only up to 50 or 55%, whereas seedlings are digested up to 90 to 95%.

For producing seedlings or germinated seeds without earth, the seeds and subsequently the seedlings are, according to the invention periodically subjected, simultaneously or alternately, to the action of fertilizers for plants dissolved in water and to the action of weak electric currents.

It is advisable, to employ weak electric currents of a certain strength and voltage, and thus to increase the absorption and expulsion of water, the absorption of the nutritive substances, the supply of carbon dioxide and the production of starch.

According to the invention the electric current employed is produced in that electrodes of different polarity, conductively connected for the purpose of circuit closing, are arranged in an electrolyte which is formed of moist seeds or seedlings saturated with fertilizer and electrolytic salts. The strength and voltage of the weak electric current is regulated by correspondingly dimensioning the electrodes and by adding suitable electrolytic salts to the fertilizer solution.

The action of the current preferably takes place in relatively long intervals. These intervals are attained, according to the invention, either by drying the material to be germinated, which is saturated at certain intervals with an aqueous solution containing fertilizers and electrolytic salts, whereby reduction of the electric conductivity is obtained, or by mechanically interrupting the circuit, or by combination of both means.

According to the invention vegetable nutriments and fodders are produced within a few days, independently of the season and the climate. The invention is therefore of particular importance if the natural earth production no longer supplies vegetable nutriments and fodders.

The equipment serving for carrying out the method is illustrated in perspective by way of example in the accompanying drawing, in which:—

Figure 1:
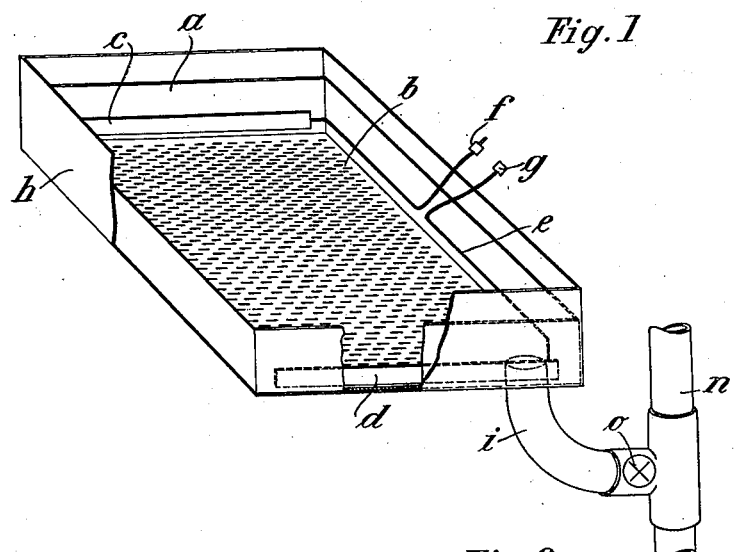
Figure 2:
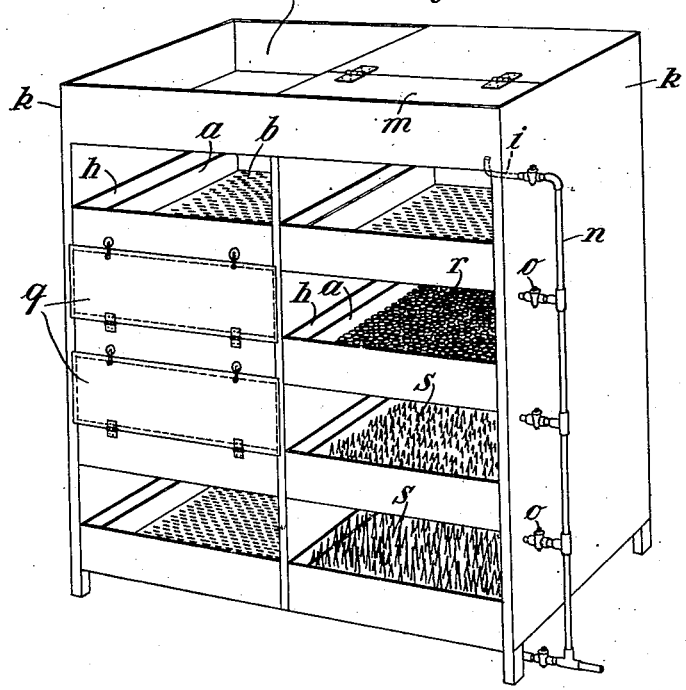

Fig. 1 shows a single equipment.
Fig. 2 shows a plurality of such equipments united in a common casing.

A flat box $a$, having a perforated bottom $b$ or rendered permeable to water in some other manner, serves for accommodating the seeds. Electrodes $c$, $d$ of different polarity are mounted in the box $a$. These electrodes $c$, $d$ are interconnected by a lead $e$ which forms part of a circuit adapted to be closed and interrupted by a switching device. In Fig. 1 the circuit through lead $e$ is interrupted, a plug device serving for making or breaking the circuit. The plug $f$ is attached to one end of the lead $e$ and a plug socket $g$ to the other end thereof. The box $a$, $b$ is located in a shallow container $h$ provided with an inlet and outlet $i$ for the liquid.

A plurality of containers $h$, together with the boxes $a$, $b$, are preferably arranged in a heat-insulating casing $k$. Vessels $l$ for water and fertilizer are provided on this casing $k$. The water vessels $l$ are preferably covered, and this covering comprises a hingedly mounted lid $m$.

In Fig. 2 the left hand vessels $l$ is shown without covering. The liquid can be fed from the vessels $l$ to the containers $h$ or boxes $a$, $b$ through pipe conduits $n$ and valves $o$. The casing $k$ may be closed by doors. However, as shown in Fig. 2, hingedly mounted or removable cover plates, preferably having inspection windows, may also be employed for covering the individual compartments.

The arrangement described is employed in the following manner: The seed grains $r$ are placed in a layer several centimeters thick on the bottom $b$ of the boxes $a$ and watered several times every day with warm water, to which fertilizers and electrolytic salts have been added. The seedlings $s$ are treated in a similar manner to these seeds.

The seeds or seedlings cover the electrodes $c$, $d$ and, in moistened condition, form the electrolyte. During the watering, when the seeds are completely covered with water, no electric influencing of the seeds or seedlings takes place, because the current is short-circuited by the water. When the water has run off, the current formation takes place through the moist seeds or seedlings, decreases as the seeds or seedlings dry and finally ceases entirely. The same procedure takes place every time the seeds or seedlings are watered.

The current formation may also be mechanically interrupted as desired, as shown in Fig. 1.

I claim:—

1. A method for producing seedings and germinated seeds without earth, consisting in saturating seeds, seedlings and germinated plants with a mixture of dissolved fertilizers and electrolytic salts to form electrolytes and inserting therein as current producing electrodes two different conductive interconnected metals of the electric contact series.

2. A method for producing seedlings and germinated seeds without earth, consisting in saturating at predetermined intervals seeds, seedlings and germinated plants with a mixture of dissolved fertilizers and electrolytic salts to form electrolytes and inserting therein as current producing electrodes two different conductive interconnected metals of the electric contact series, said electrolyte gradually automatically becoming less effective and finally entirely ineffective as said seeds, seedlings and germinated plants gradually dry.

3. An arrangement for producing seedlings and germinated seeds without earth, comprising a container of electricity insulating material having a porous bottom, two different interconnected conductive electrodes of the electric contact series arranged in said container, and an electrolyte composed of moistened seeds, seedlings and germinated seeds filled in said container and forming with said electrodes an electric cell.

HERMANN BECK.